United States Patent
Holiday et al.

(10) Patent No.: US 6,381,219 B1
(45) Date of Patent: Apr. 30, 2002

(54) CHANNEL INTEGRITY IN A VOICE-ON-ATM NETWORK

(75) Inventors: Matthew R. Holiday, Allen; David Wesley McKnight, Garland, both of TX (US)

(73) Assignee: Northern Telecom Limited, Montreal (CA)

(*) Notice: Subject to any disclaimer, the term of this patent is extended or adjusted under 35 U.S.C. 154(b) by 0 days.

(21) Appl. No.: 09/189,605

(22) Filed: Nov. 10, 1998

(51) Int. Cl.[7] .............................................. H04L 12/46

(52) U.S. Cl. ........................ 370/250; 370/395; 370/397

(58) Field of Search ................................. 370/241, 250, 370/352, 353, 554, 395, 397, 449

(56) References Cited

U.S. PATENT DOCUMENTS

| | | | | |
|---|---|---|---|---|
| 5,563,874 A | * | 10/1996 | Kant ........................... | 370/252 |
| 5,751,698 A | * | 5/1998 | Cushman et al. ............ | 370/252 |
| 5,818,842 A | * | 10/1998 | Burwell et al. .............. | 370/397 |
| 5,987,320 A | * | 11/1999 | Bobick ........................ | 455/425 |
| 6,067,286 A | * | 5/2000 | Jones et al. .................. | 370/248 |

OTHER PUBLICATIONS

V. Ramaswami and J.L. Wang "Analysis of the Link Error Monitoring Protocols in the Common Channel signaling Network" IEEE Transactions on Networking, vol. 1, 1993, pp. 31–47.*

* cited by examiner

Primary Examiner—Alpus H. Hsu
Assistant Examiner—Afsar M. Qureshi
(74) Attorney, Agent, or Firm—Haynes and Boone, LLP

(57) ABSTRACT

An application and method for analyzing a virtual circuit in an asynchronous transfer mode ("ATM") network is disclosed. The ATM network may include multiple switches and connects two telecommunications networks through two interface devices, one for each telecommunications network. A virtual circuit is created in the ATM network between the two telecommunications networks, connecting to the first telecommunications network through a port of the first interface device and the second telecommunications network through a port of the second interface device. The method transfers a data value from the port of the first interface device to the port of the second interface device before or during a call. The data value identifies the two ports. In this way, the data value can later be examined to determine if it still identifies the two ports. By so doing, the examining interface device can determine a status of the virtual circuit.

8 Claims, 3 Drawing Sheets

CHANNEL INTEGRITY IN A VOICE-ON-ATM NETWORK

TECHNICAL FIELD

This invention relates generally to management techniques for a communications network and, more particularly, to a system and method for completing, monitoring, and maintaining a connection in the communications network.

BACKGROUND OF THE INVENTION

There are many types of calls that are performed in various communications networks. The public switched telephone network ("PSTN") handles voice calls between two voice terminals and has been adapted to handle data calls between two data terminals through use of modems and the like. Likewise, many data networks, such as the internet, handle data and voice calls between two terminals.

One type of data network is an ATM network. ATM, or asynchronous transfer mode, is a method for transmitting and receiving information around a network of switches and routers and is defined according to the International Telecommunications Union-Telecommunications Services Sector (ITU-T). An ATM network includes one or more ATM switches for handling multiple connections between two or more endpoints. The ATM network may be within a building, or can span several countries.

One key feature of ATM is that it is designed to allow different services such as video, voice and computer data to be mixed simultaneously on the same network. This is because ATM networks utilize "cells" for carrying information. Each cell has a 5 byte header and a 48 byte payload, thereby setting a fixed size of 53 bytes. The fixed cell size of ATM is beneficial because it allows traffic to flow in a predictable manner, which works well with services such as voice and video.

In an ATM network, the path between any two end points is set up once for any particular call. Once the path is established, the cells only contain the identity of that path. This helps the ATM network work at high speeds, increases predictability and leads to the concept of specialized paths called "virtual circuits."

A virtual circuit is a path between two end devices that appears to a user to be a dedicated point-to-point circuit. An ATM network has multiple ways of setting up and grouping virtual circuits, including a permanent virtual circuit and a switched virtual circuit. A permanent virtual circuit ("PVC") is a connection that is set up by an administrator of the ATM network and exists even if no traffic is using the circuit. Also, a PVC has fixed parameters, independent of the traffic pattern using the path. Although a PVC is not an efficient use of bandwidth, it is still desirable because it does not have to be setup or torn down for each call.

A switched virtual circuit ("SVC") is a connection that only exists when there is actual traffic to be sent down that path. An SVC has variable parameters that will change depending on the traffic pattern. The SVC is desirable because it uses the bandwidth of the ATM network more efficiently than a PVC. However, because each SVC requires that a path be connected and disconnected through multiple ATM switches for each call, it is a labor intensive process. Most ATM switches can not perform this process very quickly (e.g., the maximum number of SVC's that can be setup per second is relatively low).

ATM networks often serve as a "backbone" connecting two or more non-ATM networks. For example, a computer network which uses Ethernet may be connected to another Ethernet network via an ATM network. A router is used at each interface between the ATM and Ethernet networks to control access and to translate between the Ethernet data stream (having packets of variable length) and the ATM data stream (having cells of fixed length). Two or more telephone networks may also be connected via an ATM backbone. An access interface device (similar to the router in a computer network) is required at the connection point between the ATM and telephone networks to control access and to convert between the continuous voice streams of the telephone networks and the data stream of fixed length ATM cells. In large ATM and telephone networks, each access interface (AI) device has very many channels, or ports, so that one port is available for each path through the ATM network.

One common telephone network that is connected to an ATM network is a time division multiplexing (TDM) network. A TDM network provides a way to merge data from several sources into a single channel for communication over telephone lines, a microwave system or a satellite system. This single channel is divided into time slots and each transmitting device is assigned at least one of the time slots for its transmission.

However, telephone networks require many voice paths through the ATM network. And as discussed above, while SVCs are desirable to efficiently use the bandwidth of the ATM network, they cannot be setup and torn down quickly enough to properly handle many telephone networks. Further still, problems with path integrity and re-use of SVCs in an ATM network further reduce the quality of service provided by conventional ATM networks using SVCs.

It is desired to more efficiently use an ATM network as a backbone between two or more other networks such as TDM networks.

It is also desired to provide increase integrity of an SVC in an ATM network when connected between two or more other voice networks such as TDM networks. Integrity is significant to ensuring quality of service in a voice-on-ATM network, particularly in the case where (semi) permanent paths through the ATM network are to be reused over many calls.

It is further desired to prevent an SVC in an ATM network from being simultaneously used by two different calls. Such prevention supports the reuse of SVCs over many calls.

SUMMARY OF THE INVENTION

The present invention, accordingly, provides an application and method for analyzing a virtual circuit in a data network. The data network may include multiple switches and connect to multiple devices and/or networks. In one embodiment, the data network interconnects at least two telecommunications networks through at least two interface devices, one for each telecommunications network. A virtual circuit is created in the data network between the two telecommunications networks, connecting to the first telecommunications network through a port of the first interface device and to the second telecommunications network through a port of the second interface device.

The method transfers a data value from the port of the first interface device to the port of the second interface device through the virtual circuit. The data value identifies the two ports. In this way, the data value can later be examined to determine a status of the virtual circuit. For example, if no data value is ever received, the status of the virtual circuit is that no data is flowing and the virtual circuit has been corrupted. If the data value is changed, the status of the virtual circuit is that data is flowing, but there may have been a premature re-use of the virtual circuit.

One problem with the virtual circuit occurs when two ports are simultaneously trying to initiate a call on the same virtual circuit, i.e., a glare condition. This can happen when using cached virtual circuits. The above-described method can detect the glare condition when it examines the received data value.

In one embodiment, the data network is an asynchronous transfer mode ("ATM") network and the two telecommunications networks are time division multiplexing networks. In this embodiment, the method can be part of an application that exists on the fifth (upper-most) layer of the ATM protocol reference model. This works well with calls that contain either voice or video data.

One benefit of the present invention, with respect to the embodiments described above, is that information is passed between two endpoints in a voice-on-ATM call to ensure the continuing existence of the voice-path.

Another benefit of the present invention, with respect to the embodiments described above, is that a glare condition or premature reuse of a path through a network can be detected.

Yet another benefit of the present invention, with respect to the embodiments described above, is that it can be easily implemented by an application on the upper-most layer of the network model, without requiring any new hardware.

DESCRIPTION OF A PREFERRED EMBODIMENT

Figure 1:
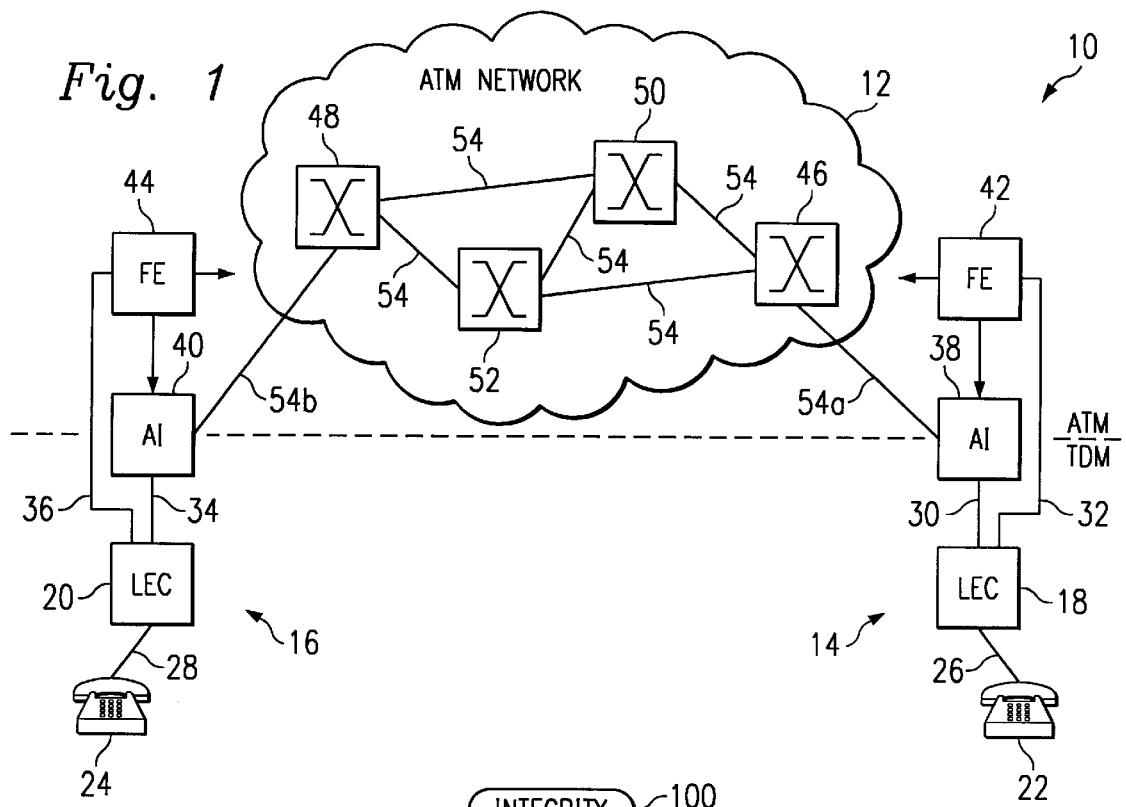
FIG. 1 is a functional block diagram of two TDM networks interconnected by an ATM network for implementing features of the present invention.

Turning now to the drawings, in FIG. 1, the reference numeral 10 designates a telecommunications system 10. For the sake of example, the system 10 include an ATM network 12 and two TDM networks 14, 16. The TDM networks 14, 16 are illustrated each with a single local exchange carrier ("LEC") 18, 20, respectively. It is understood, however, that the LECs 18, 20 are representative of many types of networks, including private branch exchanges, long distance networks, local area networks, cable networks, and so forth.

Terminals 22, 24 are connected to LECs 18, 20 through telephone lines 26, 28, respectively. In the present example, terminals 22, 24 are telephones, but other types of terminals can also be used. The LEC 18 is capable of connecting the telephone line 26 to a voice channel 30 associated with a signal channel 32. Likewise, the LEC 20 is capable of connecting the telephone line 28 to a voice channel 34 associated with a signal channel 36. The voice channels 30, 34 further connect to access interfaces (AIs) 38, 40, respectively, and the signal channels 32, 36 further connect to front ends 42, 44, respectively. In larger telecommunication systems, many AIs and many front ends will exist for providing an interface to and between the ATM network 12 and the TDM networks 14, 16. Therefore, the number of AIs and front ends illustrated in FIG. 1 are limited for the sake of simplicity.

The ATM network 12 includes a plurality of ATM switches, including edge switches 46, 48 and backbone switches 50, 52. Data paths 54 interconnect the ATM switches 46–52, including a path 54a between switch and AI 38 and a path 54b between switch 48 and AI 40. The front ends 42, 44, are connected to a signaling system 7 ("SS7") link (not shown) through the ATM network 12 where call logic (signaling) is processed, such as setting up an SVC for a call. The SS7 link is not related to the ATM switches' call processing for SVC setup. It is understood, however, that the function of SVC setup takes place between the AIs 38, 40 and the ATM network 12 using an ATM interface such as a user network interface is ("UNI") or a private network-network interface ("PNNI").

The front ends 42, 44 perform telephony call processing logic on the signaling received on the signal channels 32, 36, such as translating a called number and routing the call by causing the AIs to establish a connection through the ATM network.

The ATM network 12 is capable of simultaneously establishing multiple SVCs through the various ATM switches 46–52 and data paths 54. In this way, one or more calls can be supported at the same time. For example, a call between the telephones 22, 24 can be established and maintained through channels, or ports, on the AIs 38, 40, respectively and using an SVC in the ATM network 12 between the two AIs. However, after an SVC has been established (and the front ends 42, 44 become idle with respect to the call), it is important to be certain that the call integrity is maintained. That is, during the life of the call, the SVC should properly and continuously connect the appropriate ports on the AIs 42, 44.

Maintaining the Integrity of a Circuit

Figure 2:
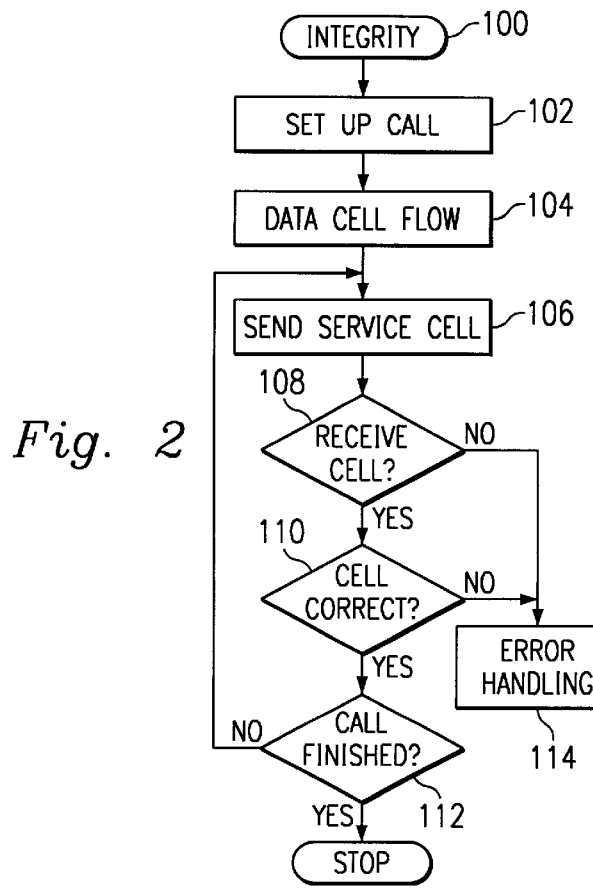
FIG. 2 is a flow chart of a method for maintaining the integrity of a virtual circuit in the ATM network of FIG. 1.

Referring to FIG. 2, a method 100 is performed by an application protocol of the ATM network 12 to maintain the integrity of each SVC. For the sake of further example, an application using the F5 application-specific maintenance flow will be described for implementing the method 100. The F5 application-specific maintenance flow operates for a specific virtual circuit and F5 service cells are carried within that circuit along with data cells. The F5 application-specific maintenance flow is a function that exists on the fifth (upper-most) layer of the ATM protocol reference model according to the International Telecommunications Union-Telecommunications Services Sector (ITU-T).

At step 102, a call is initiated and an SVC is provided for the call. For the sake of example, the call is started by terminal 22 and is directed to terminal 24. The LEC 18 routes the call to AI 38 (the originating AI) and front end 42, which then obtains an SVC for the call. The front ends 42, 44 may construct the SVC specifically for the call, or the front end 42 may use a pre-existing SVC that is now available. The front ends 42, 44 exchange port numbers assigned in the respective AIs 38, 40. The SVC uses a specific port in AI 38 which is assigned to the call (e.g., port number 32). Likewise, the SVC uses a specific port in AI 40 (the terminating AI) which is assigned to the call (e.g., port number 11). AI 40 then routes the call to the LEC 20 which completes the call to terminal 24.

At step 104, data cells begin to flow over the SVC, back and forth between the AIs 38, 40 and eventually the terminals 22, 24. At step 106, after a predetermined time, the originating AI (AI 38) sends an F5 service cell. The F5 service cell has information that indicates the port number of the originating AI (AI 38) and the port number of the terminating AI (AI 40). In the present example, the F5 service cell includes the data (32, 11). At step 108, the terminating AI (AI 40) waits a predetermined period of time to receive the F5 service cell. As described in greater detail below, the F5 service cell not only allows the F5 function to determine if the SVC is good, but also to determine that the data flow between the AIs 38, 40 is also good.

At step 110, the AI 40 examines the received FE service cell. If the data in the F5 service cell is correct, the method 100 thereby determines that data is indeed flowing through the SVC and that the SVC's integrity status is good. Execution then proceeds to step 112 where the call progress is checked. If the call is finished, execution stops. Otherwise, execution returns to step 106 where the terminating AI (AI 40) sends the F5 service cell (which includes the data (32, 11)) back to the originating AI (AI 38). The F5 service cells continue to go back and forth between the two AIs until the call is finished.

If at step 108 the service cell is never received, the F5 application thereby determines that no data is flowing through the SVC. Execution then proceeds to step 114 where appropriate action can be taken. The appropriate action may include re-establishing the SVC for the call or notifying an administrator system of the error.

If at step 110 the data in the service cell is incorrect, the F5 application thereby determines that even though data is flowing, the SVC has been compromised, e.g., the SVC is not connected to the correct ports in the respective AIs. Execution then proceeds to step 114 where appropriate action can be taken.

Detecting and Handling a Glare Condition

As discussed above, one of the drawbacks of using SVCs is that each SVC requires that a connection be set up and torn down through multiple ATM switches for each call. This process is labor intensive and most ATM switches can not perform this connection very quickly (i.e., the maximum number of SVC's that can be setup per second is relatively low).

One solution is to store-up or cache SVCs after they have been used. Instead of disconnecting an SVC after a call is finished, the SVC is cached and maintained for a period of time. If another call that uses the same two AIs that were used for the cached SVC is initiated, the cached SVC can then be reused. As a result, the labor of setting up an SVC for that call has been avoided. However, a problem occurs when both AIs on a single cached SVC try to utilize the SVC at the same time (a "glare" condition).

Figure 3:
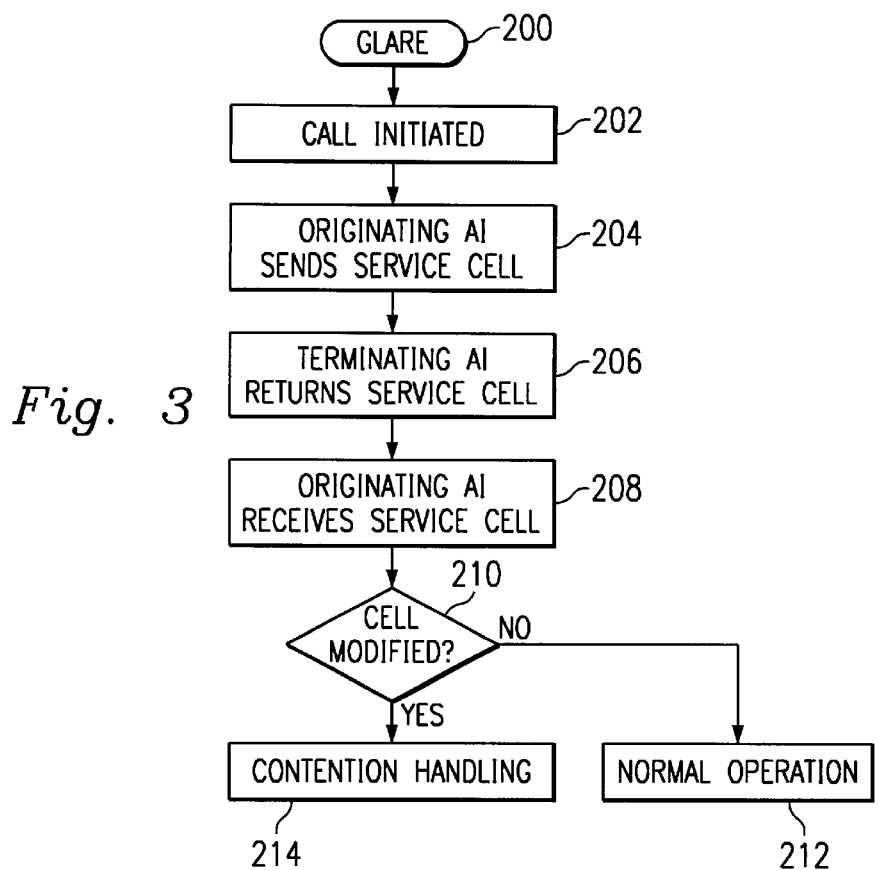
FIG. 3 is a flow chart of a method for handling a glare condition in a virtual circuit in the ATM network of FIG. 1.

Referring to FIG. 3, a method 200 is performed by an application protocol of the ATM network 12 to handle the glare condition. Using the same example as discussed in FIG. 2, an F5 application will be described for implementing the method 200. It is understood, however, that the application performing the method 200 may be part of the same application performing the method 100, or may be a totally separate application.

At step 202 a call is initiated by a terminal connectible to one of the AIs and its associated front end. For the sake of example, the call is started by terminal 22 and is directed to terminal 24. The LEC 18 routes the call to AI 38 (the originating AI) and front end 42, which then obtains a cached SVC for the call. The front ends 42, 44 exchange port numbers in the respective AIs 38, 40. The AI 38 uses a specific port which is already connected to the SVC (e.g., port number 32). The AI 40 (the terminating AI) also uses a specific port which is already connected to the SVC (e.g., port number 11).

At step 204, the originating AI (AI 38) sends a service cell on the cached SVC towards the terminating AI (AI 40). The service cell has information that indicates the port number of the originating AI (port 32 of AI 38) and the port number of the terminating AI (port 11 of AI 40). In the present example, the service cell includes the data (32, 11). At step 206, the terminating AI sends the data from the service cell back towards the originating AI. At step 208, the originating AI receives the service cell, which includes the data (32, 11) from the terminating AI. At step 210, the originating AI examines the received service cell. If the first service cell was returned unmodified, there is no glare condition, the status of the SVC is good, and execution proceeds to step 212 for normal operation. If, however, the first service cell was returned modified, or not returned at all, a glare condition may exist and execution proceeds to step 214 for a contention routine. The contention routine can determine what to do with the SVC, such as perform an arbitration analysis to determine which AI should use the SVC or select different SVCs for both calls altogether.

Figure 4A:
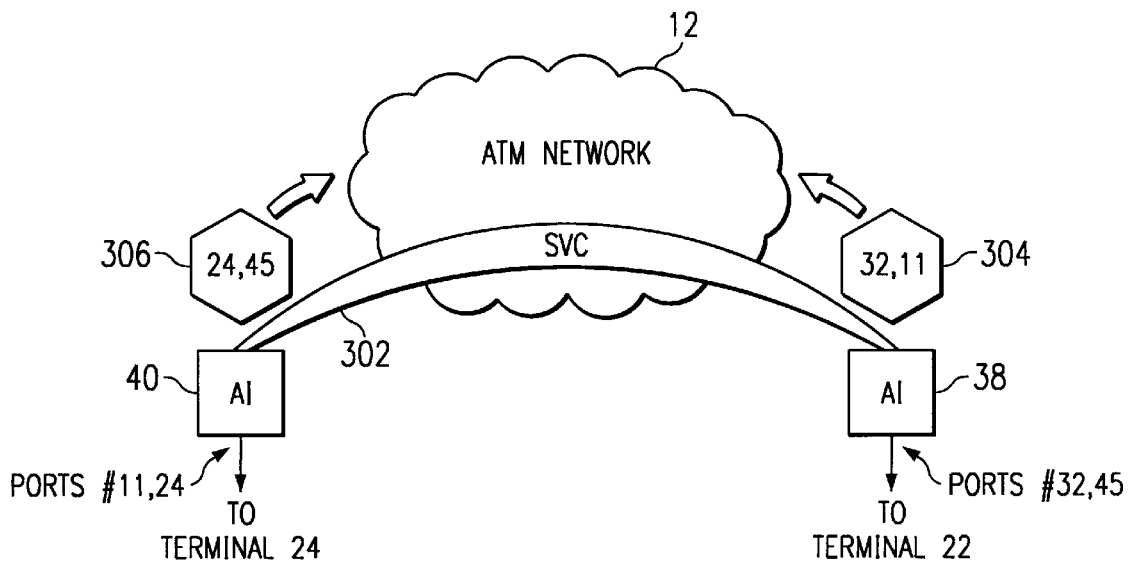
FIGS. 4a, 4b, and 4c are flow diagrams for illustrating the method of FIG. 3 in a glare condition.
Figure 4B:
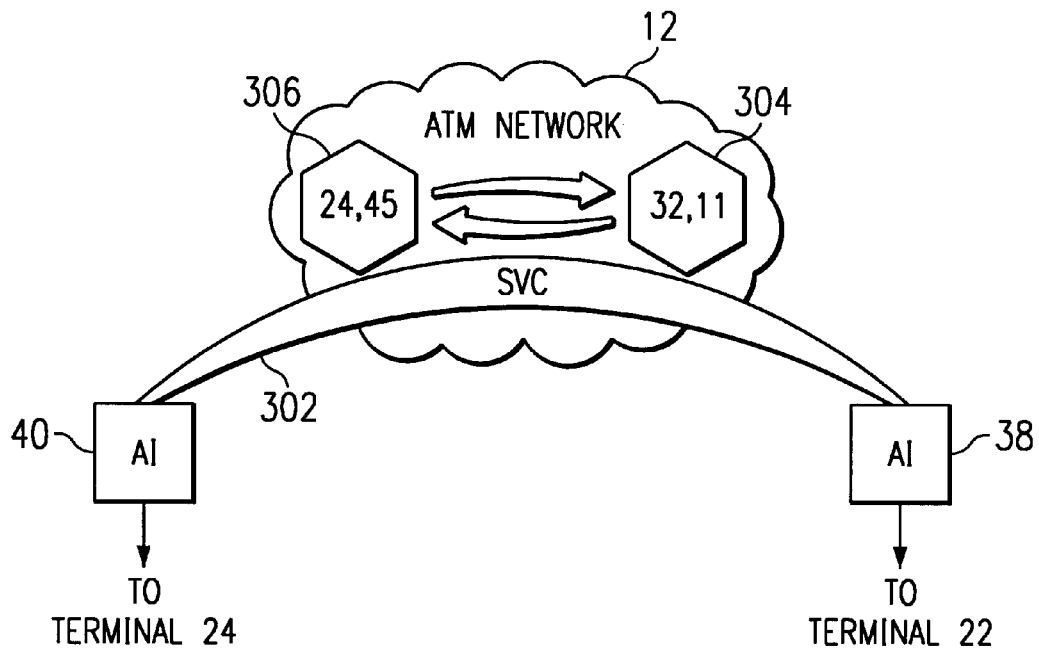
Figure 4C:
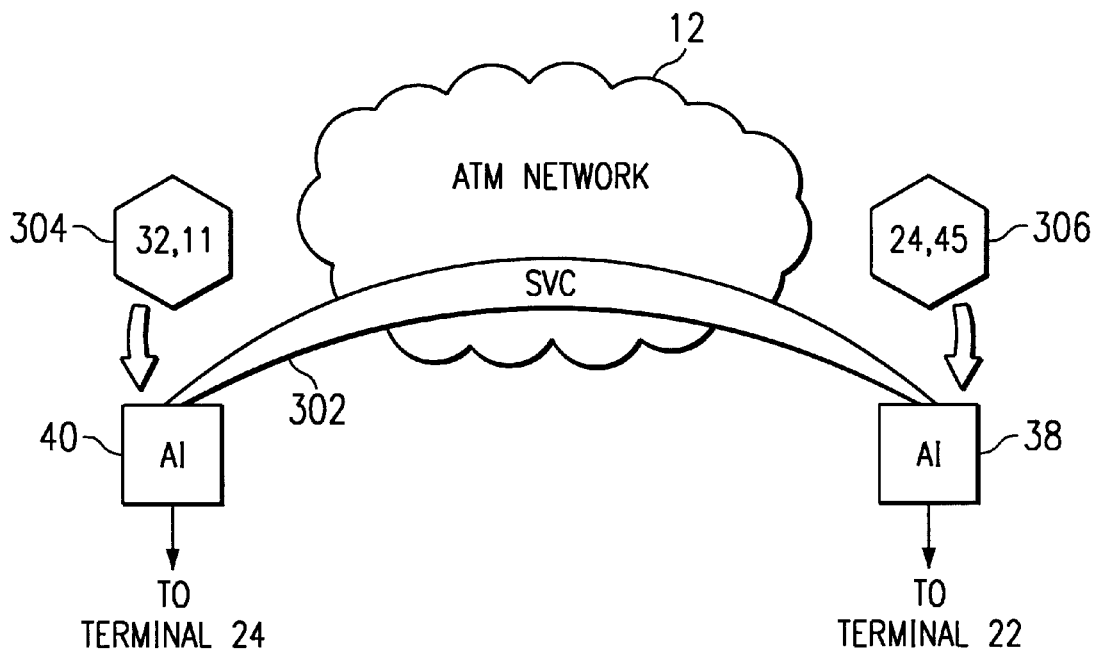

Referring also to FIGS. 4a–4c, the method 200 can be simultaneously performed multiple times in the ATM network 12 and can thereby be used to detect a glare condition. To provide an example of a glare condition, a call flow is illustrated in FIGS. 4a–4c that shows two instances of the method 200 being performed at about the same time. The two instances are being performed on a common cached SVC 302 so that a glare condition will occur.

Referring initially to FIG. 4a, the first instance of the method 200 is the same as the example described above with reference to FIG. 3. In this example, AI 38 is the originating AI and attempts to use the SVC 302 to complete a call. The AI 38 sends out a first service cell that includes information that indicates the port number it is using as well as the port number of the terminating AI (AI 40). Continuing with the example of FIG. 3, the first service cell includes the data (32, 11), designated in FIGS. 4a–4c with the reference numeral 304.

In the second instance, a call is being started by terminal 24 and is directed to terminal 22. The LEC 20 routes the call to AI 40 and front end 44, which then obtains the cached SVC 302 for the call. Since the first and second instance are happening at about the same time, AI 40 considers SVC 302 to be available. The AI 40 sends out a second service cell that includes the data of ports at AI 40 and 38 (e.g., the data (24, 45)). The second service cell is designated in FIGS. 4a–4c with the reference numeral 306.

Referring now to FIG. 4b, the two service cells 304, 306 pass each other somewhere in the ATM network 12.

Referring now to FIG. 4c, since the present example illustrates a glare condition, step 206 of FIG. 3 will not be performed by the respective terminating AIs because each was trying to use the SVC 302 at about the same time. Instead, at step 208, AI 40 will receive the first service cell 304 that includes the data (32, 11) and AI 38 will receive the second service cell 306 that includes the data (24, 45). At step 210, each AI will recognize that the service cell that it received is different from the service cell it transmitted. Therefore, the status of the SVC 302 indicates a glare condition. Execution then proceeds to step 214 for a contention routine. The contention routine may, for example, decide that AI 38 may use SVC 302 and AI 40 must find another SVC.

Although illustrative embodiments of the invention have been shown and described, other modifications, changes, and substitutions are intended in the foregoing disclosure.

For example, functionality performed by certain components may instead be performed by a group of devices that, in essence, work together to achieve the same goals. Further still, while the connection protocol is disclosed in conjunction with the completion of a call in an ATM network, the disclosed protocol is equally suitable for use in conjunction with other data networks. Accordingly, it is appropriate that the appended claims be construed broadly and in a manner consistent with the scope of the invention.

What is claimed is:

1. A method for detecting glare in a switched virtual circuit, the method comprising:

receiving a call into an originating interface device;

selecting the switched virtual circuit from one or more cached virtual circuits;

creating a first unique data set that includes originating and termination identifiers in the switched virtual circuit;

transmitting the first unique data set on the switched virtual circuit;

receiving a second unique data set from the switched virtual circuit; and comparing the first and second unique data sets.

2. The method of claim 1 wherein, if the first and second unique data sets are the same, determining that no glare condition exists.

3. The method of claim 1 wherein, if the first and second unique data sets are not the same, determining that a glare condition exists.

4. The method of claim 1 wherein the originating and termination interface devices connect further to first and second telephone networks, respectively.

5. The method of claim 4 wherein the switched virtual circuit is part of an ATM network and both the first and second telephone networks are TDM networks.

6. The method of claim 5 wherein the switched virtual circuit can carry both voice data and video data.

7. The method of claim 5 wherein the first and second unique data sets are parts of service cells used by an F5 application of the ATM network.

8. In an ATM network that serves as a backbone between a first and second telecommunication network, an application for analyzing a virtual circuit in the ATM network, the application comprising:

means for identifying a channel of a first interface device between the first telecommunication network and the virtual circuit of the ATM network;

means for identifying a channel of a second interface device between the second telecommunication network and the virtual circuit of the ATM network;

means for transferring a cell including a data value along the virtual circuit, wherein the data value identifies the two circuits;

means for examining the data value, if the cell is received, to determine if it correctly identifies the two circuits; and means for determining a status of the virtual circuit from the examination;

wherein the virtual circuit is a cached, switched virtual circuit and the status of the virtual circuit indicates a glare condition on the circuit.

* * * * *

UNITED STATES PATENT AND TRADEMARK OFFICE
CERTIFICATE OF CORRECTION

PATENT NO.    : 6,381,219 B1
DATED         : April 30, 2002
INVENTOR(S)   : Matthew R. Holiday and David Wesley McKnight It is certified that error appears in the above-identified patent and that said Letters Patent is hereby corrected as shown below:

<u>Title page,</u>
Item [73], please change the Assignee to -- Nortel Networks Limited, St. Laurent, (CA) --.

Signed and Sealed this

Twenty-fourth Day of September, 2002

Attest:

Attesting Officer

JAMES E. ROGAN
*Director of the United States Patent and Trademark Office*